Sept. 17, 1940.                R. F. PETERSON                2,215,189
                      TREATMENT OF GLYCEROL SOLUTIONS
                             Filed May 17, 1938
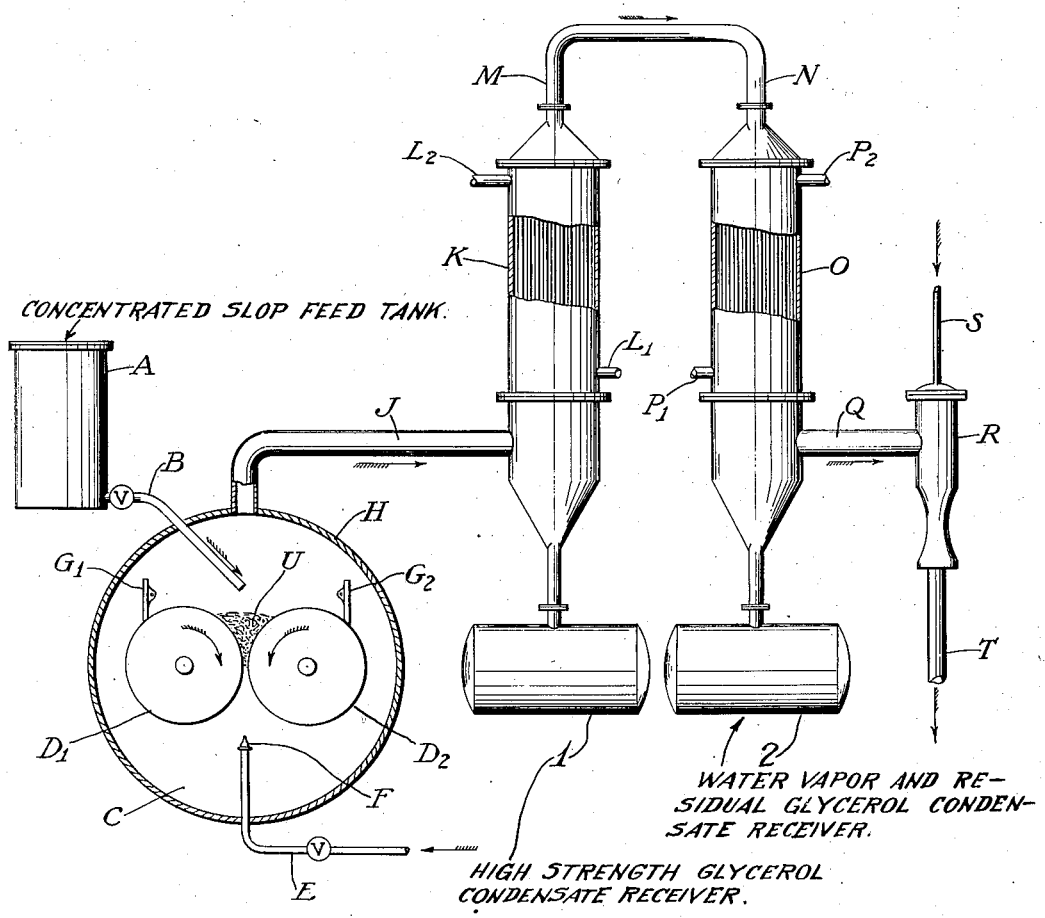
Ralph F. Peterson   INVENTOR.
BY   Thos. A. Wilson
ATTORNEY.

Patented Sept. 17, 1940

2,215,189

UNITED STATES PATENT OFFICE 2,215,189

TREATMENT OF GLYCEROL SOLUTIONS

Ralph F. Peterson, Woodbury, N. J., assignor to E. I. du Pont de Nemours & Company, Wilmington, Del., a corporation of Delaware Application May 17, 1938, Serial No. 208,407

7 Claims. (Cl. 202—64)

This invention relates to the recovery of glycerol from solutions of the same containing solid impurities, such as fermentation glycerin slops, saponification "foots", and the like, and more particularly to its recovery from solutions in which the soluble and insoluble solid impurities are of such nature and amount as to interfere with the efficient distillation of the glycerol by conventional methods.

As is well known, glycerol and alcohol are among the products formed by the fermentation of sugar, molasses, or the like, under the influence of a suitable yeast. An increased yield of glycerol is favored by maintaining the pH value of the system on the alkaline side. The fermented mash or beer is distilled to remove the alcohol, and the alcohol-free glycerol-containing beer or "slop" remains. When glycerol is to be recovered, the slop is first concentrated by the removal of a considerable amount of the water present. This concentrated slop possesses certain peculiar properties in that it displays an unusually low fluidity, and a very low heat conductance. These properties are probably the result of the high content of solid matter suspended therein. The slop possesses a substantial glycerol content, but, due to the peculiar properties noted, ia is impossible to recover a satisfactory yield of glycerol therefrom by the distillation, or other processes known to the art. The lengthy exposure to high temperatures involved in any known distillation process brings about substantial decomposition of the glycerol in said slop, with the result that negligible yields are obtained. Furthermore, it has been considered impossible to recover from said slop, glycerol of the high purity demanded for the many purposes for which it is used, such as in the production of nitroglycerine, and in the preparation of non-corrosive anti-freeze solutions, pharmaceuticals and food products.

Similar difficulties prevent the recovery of the glycerol contained in the so-called "foots" or residue accumulating at the end of the distillation of saponification crudes.

An object of the present invention is an improved method for the recovery of glycerol from solutions of the same wherein the soluble and insoluble solid impurities are of such nature and amount as to interfere with the efficient distillation of the glycerol therefrom by the usual methods. A further object is an improved method for distilling glycerol from aqueous solutions containing a high content of solid matter. A further object is a method for distilling, from the non-volatile, inorganic and carbonaceous solid matter present in concentrated fermentation slops, glycerol of such quality that it can be readily refined. A still further object is a method for recovering the non-volatile, solid content of said fermentation slops, in a commercially utilizable form. Additional objects will be disclosed as the invention is described in detail hereinafter.

I have found that the foregoing objects are accomplished by feeding the crude viscous solution of glycerol having a high content of non-volatile solids onto a heated surface in the form of a thin film, distilling the glycerol therefrom at a pressure less than atmospheric, and preferably removing the said residue from said surface to permit the deposit of additional film thereon for further distillation.

The step of properly feeding the thin film of solution onto the distilling surface is accomplished by use of a still comprising two heated, hollow, metal cylinders, or cylinders of other heat-conducting material, adapted to revolve simultaneously with just sufficient clearance so that a narrow opening is present between the surfaces of said cylinders at the locus of minimum separation. The metal cylinders revolve in opposite directions, with the tops moving toward the aperture formed by the clearance. The thick, concentrated solution is then fed into the trough formed at the top of, and between, the two cylinders. Their movement in opposing directions causes a relatively thin film of the solution to be compressed evenly on the two surfaces, or rolled therebetween.

A pressure less than atmospheric is maintained at the respective heated surfaces, which are at a temperature above the boiling point of glycerol under the reduced pressure prevailing. Glycerol is therefore distilled from the liquid fed onto the surfaces. The temperature is sufficiently high, and the rate of revolution so regulated, that substantially complete evaporation of the liquid is effected during a portion of one revolution of the cylinders, while the time of contact of the glycerol with the heated surfaces is too brief to cause decomposition. Suitable knives, or other scraping devices, remove the crusted residue from the respective surfaces before the completion of each revolution, in order that fresh surfaces may receive additional liquid for distillation.

The compression or squeezing of the viscous liquid in the narrow slit between the rollers is an essential feature in effecting the formation of the very thin, continuous film desirable for causing effective evaporation of the glycerol without local super-heating, and in an interval of time sufficiently brief to avoid decomposition at the high temperatures employed. Without employment of the two rotating cylinders and the resulting compression effect, it is impossible to form and retain a film of the viscous liquid on the heated surfaces.

By way of more exact illustration, one embodiment of the invention will be described with reference to the accompanying drawing, which shows a vertical elevation of the still and condenser arrangement for carrying out my novel process.

A relatively viscous aqueous solution of glycerol, obtained by the concentration of beer slop resulting from the fermentation of molasses and with a glycerol content of 5 to 15% and a content of dissolved and undissolved solids between 45 and 60%, is caused to flow either cold or preheated from a feed tank A, through feed line B to the trough-like chamber U formed between the surfaces of two metal cylinders $D_1$ and $D_2$, revolving on substantially horizontal axes. Retaining plates at either side of this trough space prevent the concentrated feed from flowing sideways beyond the ends of the cylinders. The two cylinders have a minimum clearance sufficiently slight so that only a thin film of solution could pass through, for example 0.040". The surfaces of the cylinders are heated to a temperature of about 290° C. by means of a heating medium circulating within said cylinders, for example, a hot liquid such as a high-temperature-resistant oil or mercury or preferably hot vapors, as for example diphenyl, diphenyl oxide or mercury vapor. The metal cylinders are revolved in opposite directions, as shown by the arrows, so that the top of each cylinder moves inward and downward toward the clearance opening. The rotation of the cylinders, therefore, tends to cause the solution in U to flow through the opening and to be compressed in an even film simultaneously onto the heated surfaces of the two cylinders. The still comprising the two revolving heated cylinders is enclosed in the evacuated chamber H, under a 29" vacuum for example, so that the glycerol is completely volatilized without decomposition.

A favorable speed of rotation for the cylinders, according to my process, is 1 to 4 R. P. M. This will vary, of course, with a variation in clearance between the cylinders and with variation in composition of the concentrated beer slop. The evacuated chamber H is heated and insulated in such manner as to prevent condensation of the glycerol vapors on the walls. Operating at the speed indicated, there is complete desiccation of the solid material in the slop during a portion of one revolution. Scraping devices in the form of knife blades are arranged, as shown by $G_1$ and $G_2$, with the edges of the blades held firmly against the surfaces of the respective cylinders as they revolve. These scrapers remove the dry caked material from the cylinders so that the surfaces are clean for the next filming of the feed onto said surfaces. Because of the high temperature and vacuum prevailing. the dry material is in light, fluffy form and free from glycerol. The dried material, scraped from the surfaces, falls to the bottom of the chamber and is periodically or continuously removed by suitable means.

It may be found desirable to introduce live steam into the evacuated chamber to facilitate distillation. This may be done by means of steam inlet E and the horizontal perforated steam distributor F.

The vapors evolved from the heated revolving surfaces pass through vapor line J first to the partial condenser K in which substantially complete condensation of the glycerol vapors takes place. This condenser is cooled by means of hot water entering and leaving by means of inlet and outlet $L_1$ and $L_2$ respectively, so that a high strength glycerol will be condensed, which flows into receiver I. The temperature in K is such that water and low-boiling impurities do not condense but pass up through vapor outlet M, thence through vapor inlet N into the cold condenser O, which is cooled by cold water entering and leaving through $P_1$ and $P_2$ respectively. Substantially all the water vapor condenses here, plus a small amount of glycerol, the condensate flowing into receiver 2. The system is maintained under vacuum by means of vacuum jet R, connected to the system by vapor line Q. Steam flows to the jet by means of line 5, while T is the exhaust line to the atmosphere.

The invention is illustrated specifically and quantitatively by the following examples.

*Example 1*

1016 lbs. of concentrated beer slop, containing 164.9 lbs. of glycerol, was fed in accordance with the process described into the trough formed between two metal cylinders revolving in opposite directions to one another so that the tops of the respective cylinders were continually moving inward toward the bottom of the trough. The cylinders were revolved at a rate of 1 R. P. M. The cylinder surfaces were maintained at an elevated temperature by means of an internal heating medium at 290° C., while the absolute pressure at the cylinder surfaces was approximately 1.2 inches of mercury. The glycerol was completely distilled in the course of less than 1 revolution of the cylinders and 42% by weight of the slop fed was scraped off as dry residue. 87.5% of the glycerol originally present was recovered in the distillate.

*Example 2*

8.53 lbs. of viscous, concentrated fermentation slop, containing 1.10 lbs. of glycerol, was distilled under conditions similar to those in Example 1, except that the velocity of rotation was 2.85 R. P. M. and the absolute pressure 1 inch of mercury. The amount of dry residue scraped from the hot surfaces constituted 38.5% of the original feed, while 95% of the glycerol originally present was recovered in the distillate.

*Example 3*

40,272 lbs. of concentrated beer slop, containing 3,544 lbs. of glycerol, was fed onto the heated surfaces of revolving metal cylinders in accordance with the general procedure described in Example 1. The speed of rotation of the cylinders was 2.5 R. P. M., and the system was maintained under an absolute pressure of 1.6 inches of mercury. The temperature of the heated cylinder surfaces was maintained between 285 and 295° C. Glycerol was distilled from the concentrated slop under the above conditions, and a yield of 90.1% of the glycerol originally present was obtained. The dry residue scraped from the heated surfaces comprised 41.5% of the weight of the feed. The composition of the residue was shown by analysis to include: potassium, calculated as $K_2O$, 14.11%;

total nitrogen 2.29%; and smaller amounts of sodium, calcium, magnesium, and phosphorous compounds.

In the foregoing examples, the glycerol solution, from which distillation was carried out, was one resulting from the concentration of a slop or beer obtained by the fermentation of molasses. My process is well adapted to the treatment of such solutions, and I may employ for example a concentrated solution resulting from the regular alcohol slops to which no alkali has been added. On the other hand, I may employ the concentrated solution resulting from fermentation, in which the alkalinity has been maintained by the addition of ammonia, as disclosed by Krug and McDermott in U. S. Patent No. 1,990,908. Furthermore, I do not wish to be limited to the distillation of glycerol from fermentation slops. For example, it is applicable to the recovery of glycerol from the so-called "foots" or residue accumulating at the end of the distillation of saponification or crudes. However, I find the process of my invention to be applicable with advantage in the case of all types of glycerol solutions where the methods of the prior art are inapplicable because of the high ratio of non-volatile solids to glycerol content. I find it particularly desirable when such ratio is between the limits of ¼ lb. to 10 lbs, of non-volatile solids per pound of glycerol. In its preferred application to concentrated fermentation slop, the ratio will commonly be around 4 to 7.5 lbs. of solids to 1 lb. of glycerol.

In the examples cited, the condensation of the glycerol vapors has been brought about in two stages, with the object of obtaining a more concentrated product in the first stage. It will be understood, however, that my invention is not limited to this method of condensation, and that total condensation of evolved vapors in one step may be desirable.

The distillation is carried out under reduced pressure, and desirably at a pressure of 0.5 to 3.0 inches of mercury. Although the temperature employed will vary with the degree of vacuum, I have found that very satisfactory distillation conditions result at 275 to 315° C. The glycerol obtained will be of relatively high concentration and of such quality that it may be refined by methods of chemical and physical treatment.

In the case of solutions wherein the ratio of non-volatile solids per pound of glycerol is very high, I have found it desirable to recycle a portion of the crude distilled glycerol to increase the fluidity of the initial viscous solution, thus assisting the feeding of the desirable thin film of said solution onto the revolving cylinders.

As has been shown in the foregoing, the distillation of a concentrated molasses fermentation slop from the heated surfaces of the revolving cylinders leaves a dry, porous crust of solid material adhering to said surfaces. This dry residue is scraped from the surfaces during the course of each revolution and is collected within the vacuated chamber, to await periodic or continuous removal. This solid product, so produced, possesses unique properties that make it a valuable commercial material. In the case of the product from our preferred source of material, namely, from a fermentation process to which no non-volatile alkali has been added, the material is non-hygroscopic, very low in alkalinity, and possesses low-density characteristics. Its apparent density, when ground to medium fineness, will be, for example, between 0.35 and 0.40 ordinarily, and always below 0.50. It contains between 10 and 20% of water-soluble potassium, calculated as $K_2O$, for example, and between 1 and 4% combined nitrogen. Because of its composition, and its bulky non-alkaline characteristics, it is a desirable ingredient of commercial fertilizers. In this respect, it has many advantages over the product resulting from the ashing of fermentation slop residue, as well as over the residue obtained by a similar distillation process from a fermentation slop, where a non-volatile alkali has been added to, or during, the fermentation. Where either of the latter two procedures has been followed, the residue will be undesirably high in alkalinity.

The advantages of my invention are numerous. It permits distillation of glycerol under conditions giving a minimum time of exposure at the minimum temperature possible to bring about substantially complete recovery of glycerol. In particular, it affords a means of obtaining high yields of glycerol, capable of being refined to a high degree of purity, from fermentation slops. In addition, it yields a commercially valuable solid residue of unusual properties. No previous method has been able to accomplish these results.

In the foregoing, my invention has been described in considerable detail. It should be understood, however, that many variations in procedure, reagents and conditions of operation may be introduced without departing from the spirit and scope of my invention. I wish to be limited, therefore, only by the following patent claims.

I claim:

1. The process of distilling glycerol from a crude solution thereof, having a high content of non-volatile solids, such as fermentation slops, foots from the distillation of saponification crudes, and the like, which process comprises supplying said solution at the locus of minimum clearance between the heated surfaces of two metallic cylinders revolving on substantially horizontal axes and with a relatively small clearance therebetween, rotating said cylnders so that the tops thereof move inward toward said locus of mnimum clearance, forming a film of said solution simultaneously on each of said heated surfaces, and distilling glycerol from said heated surfaces at a pressure less than atmospheric.

2. The process of distilling glycerol from a crude solution thereof having a high content of non-volatile solids, such as fermentation slops, foots from the distillation of saponification crudes, and the like, which process comprises supplying said solution at the locus of minimum clearance between the heated surfaces of two metallic cylinders revolving on substantally horizontal axes and with relatively small clearance therebetween, rotating said cylinders so that the tops thereof move inward toward said locus, forming a film of said solution simultaneously on each of said heated surfaces, maintaining said surfaces at an elevated temperature by the circulation of a suitable heat exchange medium through the interior of said cylinders, and distilling the glycerol from said surfaces at a pressure less than atmospheric.

3. The process of distilling glycerol from a crude solution thereof having a high content of non-volatile solids, such as fermentation slops, foots from the distillation of saponification crudes, and the like, which process comprises supplying said solution at the locus of minimum clearance between the heated surfaces of two metallic cylinders revolving on substantially horizontal axes and wth relatively small clearance therebetween, rotating said cylinders so that the tops thereof move inward toward said locus, forming a film of said solution simultaneously on each of said heated surfaces, distilling the glycerol from said heated surfaces at a pressure less than atmospheric, and introducing steam into the vicinity of said surfaces during said distillation to facilitate the removal of said glycerol.

4. The process of distilling glycerol from a fermentation slop, which process comprises supplying said slop at the locus of minimum clearance between the heated surfaces of two metallic cylinders revolving on substantially horizontal axes and with a clearance no greater than 0.040 inch therebetween, rotating said cylinders so that the tops thereof move inward toward such locus and at such rate that the glycerol is substantially all distilled during the course of one revolution, forming a film of said slop simultaneously on each of said heated surfaces, and distilling the glycerol from said surfaces at a temperature of about 275 to 315° C. and under an absolute pressure of approximately 0.5 to 3.0 inches of mercury.

5. The process of distilling glycerol from a crude solution thereof having a high content of non-volatile solids, such as fermentation slops, foots from the distillation of saponification crudes, and the like, which process comprises supplying said solution at the locus of minimum clearance between the heated surfaces of two heated cylinders revolving on substantially horizontal axes and with relatively slight clearance therebetween, rotating said cylinders so that the tops thereof move inward toward said locus of minimum clearance, forming a film of said solution simultaneously on each of said heated surfaces, distilling glycerol from said heated surfaces at a pressure less than atmospheric, and continuously removing the non-volatile constituents of said solution in dry condition from said surfaces.

6. The process of recovering glycerol from a crude solution thereof having a content of dissolved and undissolved solids between 45 and 60%, which process comprises supplying said solution at the locus of minimum clearance between the heated surfaces of two metallic cylinders revolving on substantially horizontal axes and with a clearance therebetween not greater than 0.40", rotating said cylinders so that the tops thereof move inward toward said locus of minimum clearance at a speed of 1 to 4 R. P. M., forming a film of said solution simultaneously on each of said heated surfaces, and distilling glycerol from said heated surfaces at a pressure less than atmospheric.

7. The process of claim 6 in which the crude glycerol solution comprises concentrated fermentation slop.

RALPH F. PETERSON.